(12) United States Patent
Dickey

(10) Patent No.: US 6,854,253 B2
(45) Date of Patent: Feb. 15, 2005

(54) MOWER DISCHARGE DOOR OPERATING LINKAGE MECHANISM

(76) Inventor: Jesse E. Dickey, 4402 Potts Rd., Louisville, KY (US) 40299

( * ) Notice: Subject to any disclaimer, the term of this patent is extended or adjusted under 35 U.S.C. 154(b) by 0 days.

(21) Appl. No.: 10/317,745

(22) Filed: Dec. 12, 2002

(65) Prior Publication Data

US 2004/0112031 A1 Jun. 17, 2004

(51) Int. Cl.$^7$ ............................................. A01D 67/00
(52) U.S. Cl. ..................................................... 56/320.2
(58) Field of Search ........................... 56/320.2, 17.4, 56/320.1, 1, DIG. 20, DIG. 24, 17.5, 12.4, 255, 295, 202, 203, 204, 205, 206

(56) References Cited

U.S. PATENT DOCUMENTS

| | | | |
|---|---|---|---|
| 3,816,986 A | * | 6/1974 | Van Der Gaast ............... 56/202 |
| 4,008,559 A | * | 2/1977 | Lessig et al. ............... 56/320.2 |
| 4,226,074 A | | 10/1980 | Mullet et al. |
| 4,378,668 A | * | 4/1983 | Gullett ........................ 56/12.7 |
| 4,726,178 A | | 2/1988 | Mallaney et al. |
| 4,854,115 A | * | 8/1989 | Jones et al. ................. 56/320.1 |
| 4,864,808 A | | 9/1989 | Weber |
| 5,040,364 A | * | 8/1991 | Deegan ....................... 56/320.2 |
| 5,048,279 A | | 9/1991 | Badawey et al. |
| 5,117,616 A | * | 6/1992 | McLane ....................... 56/17.5 |
| 5,133,175 A | * | 7/1992 | Dumbrell ..................... 56/17.4 |
| 5,284,007 A | | 2/1994 | Poe et al. |
| 5,331,794 A | | 7/1994 | Reichle |
| 5,410,867 A | | 5/1995 | Plamper et al. |
| 5,442,902 A | | 8/1995 | Mosley et al. |
| 5,491,964 A | | 2/1996 | Butler |
| 5,826,417 A | | 10/1998 | Evans |

* cited by examiner

*Primary Examiner*—Arpad Fabian Kovacs
(74) *Attorney, Agent, or Firm*—Carrithers Law Office PLLC; David W. Carrithers

(57) ABSTRACT

An industrial grade mower that has a cutting blade rotating in horizontal plane under an inverted dish like housing that has a cuttings discharge opening in a side wall of the housing, and a door moveably mounted on the housing selectively to cover and uncover the discharge opening respectively to mulch and discharge the cuttings. A multi link linkage system is mounted on the mower so the operator can controllably move the discharge door from one position to the other selectively to cover and uncover the discharge opening without interrupting the mowing operation. There is an actuator in proximity of the operator that is connected to a series of interconnected links and members with crank arms.

15 Claims, 8 Drawing Sheets

MOWER DISCHARGE DOOR OPERATING LINKAGE MECHANISM

BACKGROUND OF THE INVENTION

Technical Field

This invention relates generally to an improvement to an industrial grade power lawn mowers having an inverted dish like housing with one or more cutting blades thereunder that, during cutting, rotate in a horizontal plane and discharge the cuttings through an opening in a side wall of the housing. The improvement provides for an assembly for mounting on the power mower a linkage system, enabling the operator, while mowing, to move a door for the discharge opening from one position to the other of a discharge covered and uncovered positions. Moreover, newly manufactured mowers may be fabricated including the assembly comprising the linkage system, enabling the operator, while mowing, to move a door for the discharge opening from one position to the other of a discharge covered and uncovered positions.

BACKGROUND OF THE INVENTION

Industrial grade power mowers of the foregoing type are well known and they maybe of the walk behind or ride on type. The cutting swath varies and those with a 52 inch and a 61 inch are quite common whereby the 52 inch is a walk behind and the 61 inch a ride on mower. The housing of these mowers have a discharge opening in a side of the housing that presently require an operator to physically relocate themselves to the discharge opening to change from one to the other of mulching and discharging the cuttings.

In these mowers the cuttings discharge opening is located forwardly, laterally and downwardly from where the operator is located during cutting. The distance from the operator will vary depending upon the size and/or type of mower. During cutting ground and/or cutting conditions can vary considerably making it desirable to switch from one to the other of mulching and discharging the cuttings and to do so during the mowing operation without having to stop.

There is also a safety issue in the cutting discharge mode in that stones and the like objects can be propelled through the discharge opening by the cutting element. The presents of others or in the case of being in close quarters to building structures it is desirable to cover the discharge opening to prevent harm.

It is known to have a remotely actuated operator controlled cover plate on mowers as exemplified by the teachings in the following United States Patents: U.S. Pat. No. 5,826,417 granted Oct. 27, 1998 to A. L. Evans entitled 'Operator Controlled Deflector Plate for Discharge Chute of Riding Lawn Mower'; U.S. Pat. No. 5,331,794 granted Jul. 26, 1994 to L. Reichle entitled 'Mower Sheild'; and U.S. Pat. 5,133,175 granted Jul. 28, 1992 to J. A. Dumbrell entitled 'Safety Flap for Power-operated lawnmower'.

The latter patent discloses a mower with a cover plate over the mower cuttings discharge opening. The door is spring biased to a closed position and connected via a flexible cable to lever within reach of the operator seated on the mower.

The '417 patent discloses a single link mechanism for moving a discharge cover plate from one to the other of an operative and inoperative position. The single link mechanism is suitable for ride on mowers where the cutting deck is located below the operator in which case the cuttings discharge opening is in close vicinity to the operator seated on the mower.

SUMMARY OF INVENTION

An object of the present invention is to provide a multiple link linkage assembly for mounting to or being incorporated with an industrial type power mower. The linkage assembly is connected to a door covering the cuttings discharge opening and is actuated with a lever within reach of the operator in order to move the door from one closed 'mulch' position to another 'open' position selectively to mulch or discharge the cuttings while continuing to mow.

A further object of the present invention is to provide the foregoing in which the mower is a side discharge type with the discharge opening located forwardly, laterally and downwardly from the mower operator.

In keeping with the foregoing there is provided in accordance with the present invention a power mower of the type having one or more rotatable cutting elements disposed horizontally below an inverted dish like housing that has a cuttings discharge opening in a side wall of the housing and a rigid frame structure. A door mounted on the housing is moveable from one to another of first and second positions respectively covering and uncovering the discharge opening. A linkage system is mounted on the mower for controllably moving the door from one to the other of the first and second positions. The linkage system comprises a linkage actuator, means mounting said linkage actuator on the mower housing or frame at a position in easy reach of an operator of the mower during mowing. A first and second pair of arcuate members each having a crank arm radiate outwardly from a pivot mounting means thereon. Means are included for pivotally connecting the pivot mounting means of the first and second arcuate member on the mower at positions spaced apart from one another. A first link member operatively interconnects the actuator and one of the crank arms of the first arcuate member. A second link member operatively interconnects the other one of the crank arms on the first arcuate member and one of the crank arms of the second arcuate member. A third link member operatively interconnects the other one of the crank arms of the second arcuate member and the door whereby the operator is able to controllably move the discharge door from to the other of the first and second positions while mowing.

BRIEF DESCRIPTION OF THE DRAWINGS

A better understanding of the present invention will be had upon reference to the following description in conjunction with the accompanying drawings in which like numerals refer to like parts throughout the several views and wherein.

DESCRIPTION OF THE PREFERRED EMBODIMENTS

Figure 1:
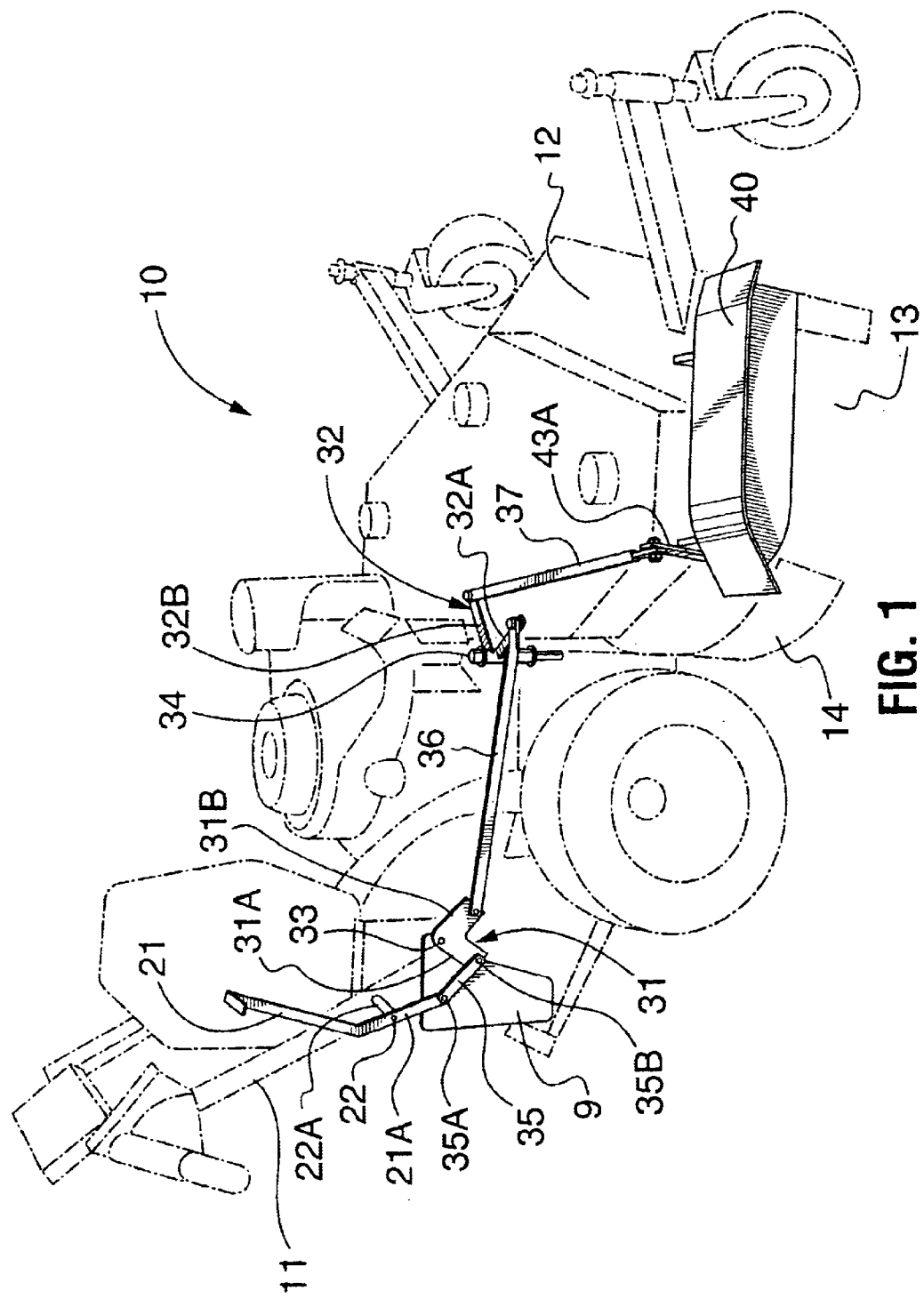
FIG. 1 is an oblique side elevational view of a walk behind 52 inch swath lawnmower having an assembly of the present invention mounted thereon that includes a discharge opening cover plate and an operator manipulated operating linkage system therefor.

Referring to the drawings illustrated in FIG. 1 is a 52 inch walk behind lawn mower 10, known commercially under the Trademark 'SCAG', having an assembly of the present invention mounted thereon in which the assembly includes an operator manipulated lever 21 pivotally attached at a selected position 22 to a post 22A secured to the mower frame portion 11, and located at a position so that the lever 21 is readily grasped by the operator. The distal end of a the lever 21 is attached to a door 40 on the mower inverted dish like housing 12 for movement from one position to another that respectively covers and uncovers a cuttings discharge opening 13 in a side wall 14 of the mower inverted dish like housing. A multi-link linkage system connected at one end thereof to a portion 21A of the lever 21 that projects downwardly from the pivot mounting 22 and at the other end to a crank arm 43A connected to the door 40.

A pair of spaced apart L-shaped hangers 41, 42, secured to the door 40, project upwardly with the upper ends thereof extending over an upper flat portion of the housing 12. A shaft 43 passes through these hanger extending portions and through an aperture in each of a spaced apart pair of brackets 44 secured to and projecting upwardly from the housing 12. The door 40 is thereby pivotally mounted on the mower housing and is so located as to cover and uncover the housing discharge opening.

The multi-link linkage system includes first and second spaced apart respective L-shaped members 31, 32 pivotally mounted respectively by pivot means 33, 34 to the rigid frame structure of the mower. It is contemplated that the mower housing may provide the structural support for mounting as well for some mowers are constructed with a frame and housing body whereas other mowers are constructed having an integral housing and frame. The member 31 has crank arms 31A and 31B radiating outwardly from the pivot means 33 and member 32 has crank arms 32A and 32B radiating outwardly from the pivot means 34. A first link member 35 is connected at opposite ends thereof by respective pivot means 35A and 35B respectively to a portion 21A of the lever 21 that extends downwardly beyond the pivot 22 and the crank arm 31A. A second link member 36 via suitable pivotal connections interconnects the crank arm 31B and the crank arm 32A and a third link member 37 interconnects the crank arm 32B and a crank arm 43A secured to and projecting upwardly from the door 40.

Moving the free upper end of the lever 21 from one extreme position in one direction to another extreme position in the opposite direction causes the door 40 respectively to fully close and fully open the housing discharge opening 13 optionally to respectively mulch or discharge the cuttings.

The lever 21 and/or the crank member 31 and/or the crank member 32 can be provided with any suitable means such a spring loaded ball projecting from at least one of the members, or the mower frame portion associated therewith, and engage able with a series of spaced apart detents in the other to maintain the door 40 at any selected position intermediate its fully open and fully closed position. The fully open position is determined by the location of the stop pin 24. Such intermediate positioning allows one to suitably set the door for discharge of the cuttings while at the same time deflecting downwardly any stones or the like that maybe propelled horizontally by the cutting element of the mower.

The pivot axes of pivots 33, 34 and rod 43 are mutually perpendicular in which the pivot axis of pivot means 34 is vertical and intermediate the other two that are horizontal and perpendicular to one another. The mower operator can move the free end of the lever 21 forwardly and rearwardly, with reference to the direction of travel of the mower, while moving i.e. on the fly to move the door from one to the other of respectively an open and a closed position on a side discharge mower.

The pivot means 34 preferably consists of a post 34A secured to the frame or housing of the mower, for example a threaded stud that is being threaded into a threaded bore in a suitable portion the mower frame and projecting vertically upwardly into a sleeve 34B secured to and projecting downwardly from the member 32. The sleeve has an open bottom end and slip fits over the upwardly projecting stud.

In the embodiment illustrated in FIG. 1 the pivot means 33 comprised a pivot pin in the free outer end of a post 33A that is secured to and the mower frame and projecting laterally therefrom. Moreover, the plate 9 is defined by a brace portion of the frame of the mower whereby bolts may be attached thereto and holes bored therein for attachment of the instant lever assembly.

Figure 4:
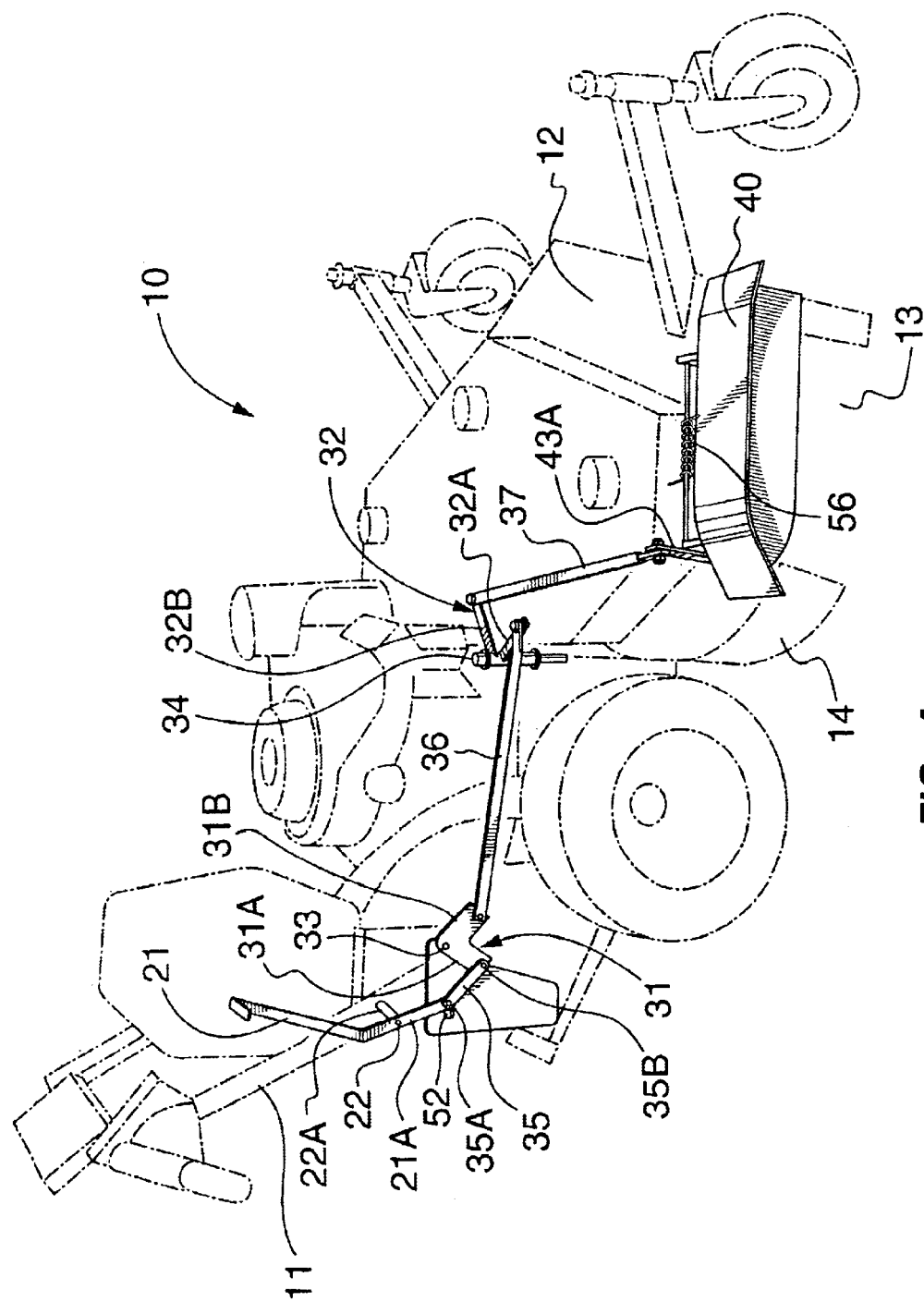
FIG. 4 is an oblique side elevational view of the 52 inch lawnmower of FIG. 1, showing a spring mounted onto the discharge chute to bias the chute in the closed position.

FIG. 4 shows the same 52 inch mower utilizing a biasing means shown as a coaxial spring 56 disposed around rod 42 having one terminal end resting on the mower housing or frame and the other terminal end exerting tension on the door 40 biasing same in the closed position. Moreover, the embodiment of FIG. 4 shows a stop means defining a peg or stud 52 whereby the door is biased open and will not shut when the link member 35 and pivot means 35A rests upon the stop stud 52.

In prototypes, applicant has found the following dimensions for various components of the linkage assembly to provide operative mechanisms on the 52 inch and 61 inch mowers sold under the Trademark 'SCAG':

|  | Mower | |
| --- | --- | --- |
|  | 52 inch | 61 inch |
| Link member 37 | 16 inch | 17 inch |
| Link member 36 | 18 inch | 19 inch |
| Link member 35 | 3¼ inch |  |
| Crank arm 32A | 3½ inch | 3½ inch |
| Crank arm 32B | 4¾ inch |  |
| Crank arm 31A |  |  |
| Crank arm 31B |  |  |

The dimensions will vary depending upon the make, model and size of the mower and also can be varied to provide the desired movement characteristics.

Figure 2:
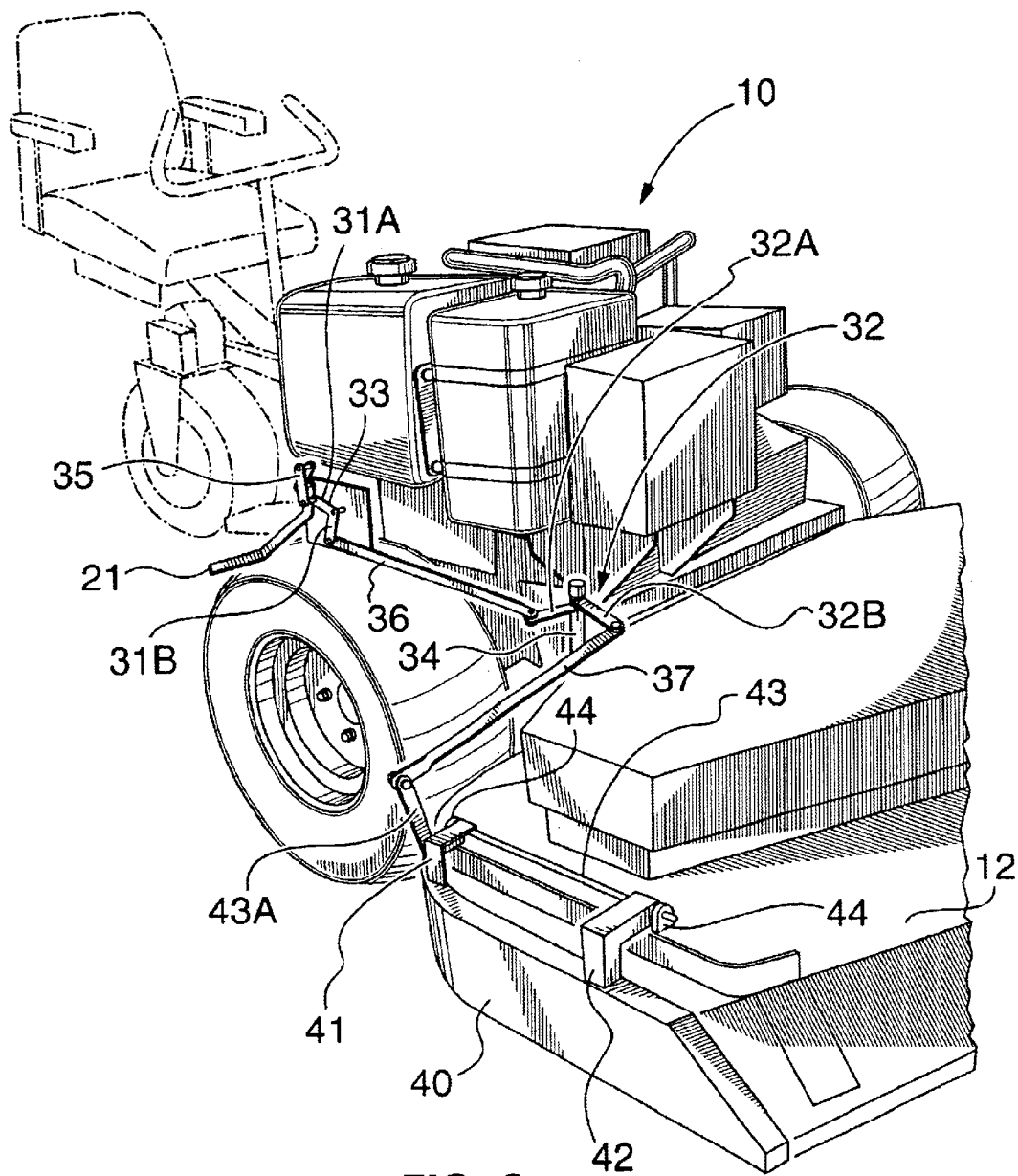
FIG. 2 is similar to FIG. 1 but illustrating a ride-on 61 inch swath lawn mower having the same assembly but including a mounting plate for some of the assembly components.
Figure 5:
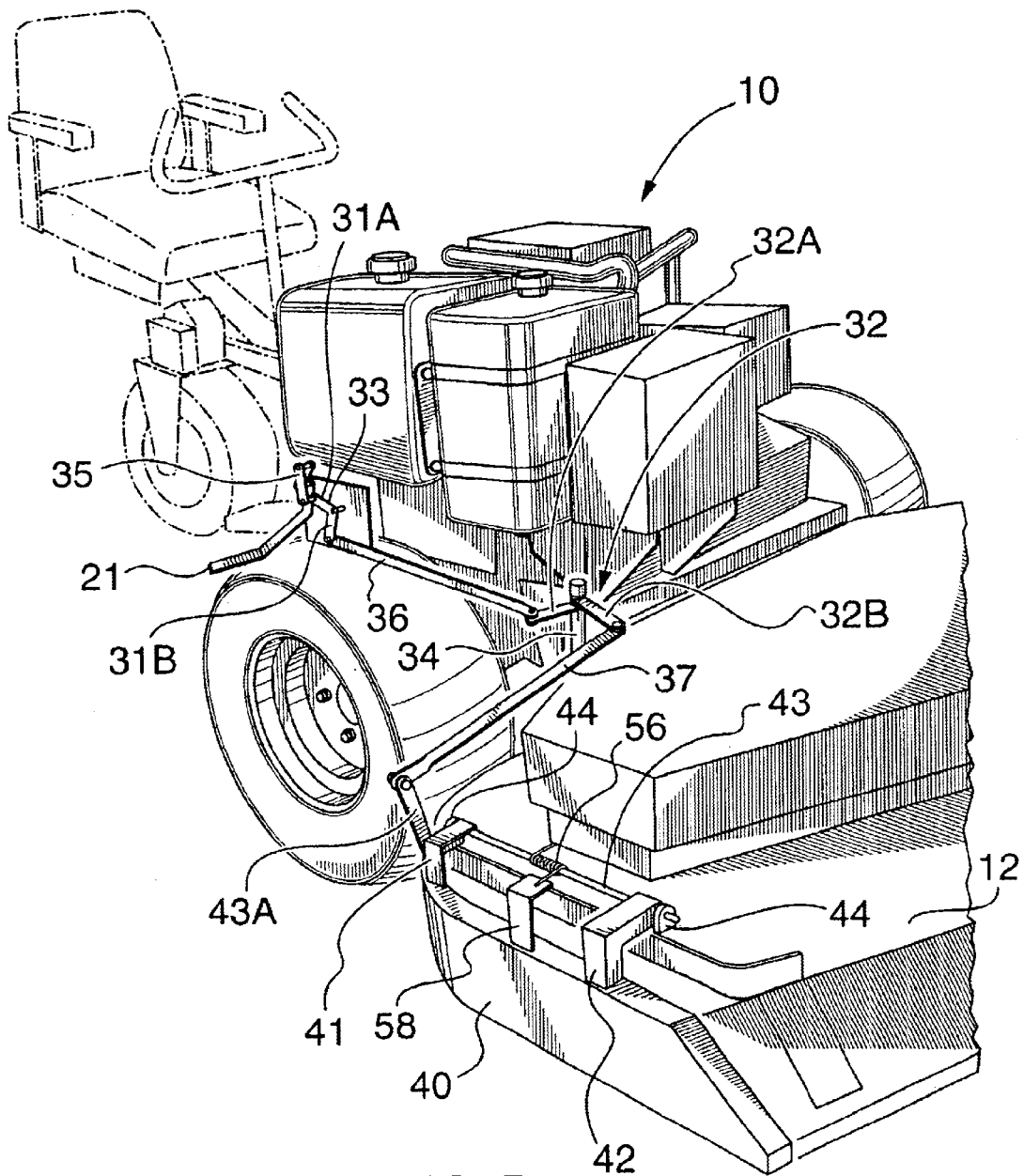
FIG. 5 is an oblique side elevational view of the 61 inch lawnmower of FIG. 2, showing a spring mounted onto the discharge chute to bias the chute in the closed position.

In the embodiment illustrated in FIG. 2, a mounting plate 23 is mounted by suitable means such as studs or bolt and nut units on the frame of a ride on mower. The lever 21 and the L-shaped member 31 are pivotally attached to the plate 23 and disposed so that the handle of the lever 21 is within easy reach of the mower operator. The rigid plate 23 maybe metal, fiberglass, or made of a plastics material and has a stop pin 24 secured to and projecting outwardly in a direction away from the mower. This stop pin is suitably located so as to be struck by the lever portion 21A and thereby define the door fully open position. FIG. 5 shows the embodiment of FIG. 2, including a biasing means shown as a coaxial spring 56 disposed around rod 42 having one terminal end resting on the mower housing or frame and the other terminal end exerting tension on an L-shaped hanger brace 58 mounted to the door 40 biasing same in the closed position.

Figure 3:
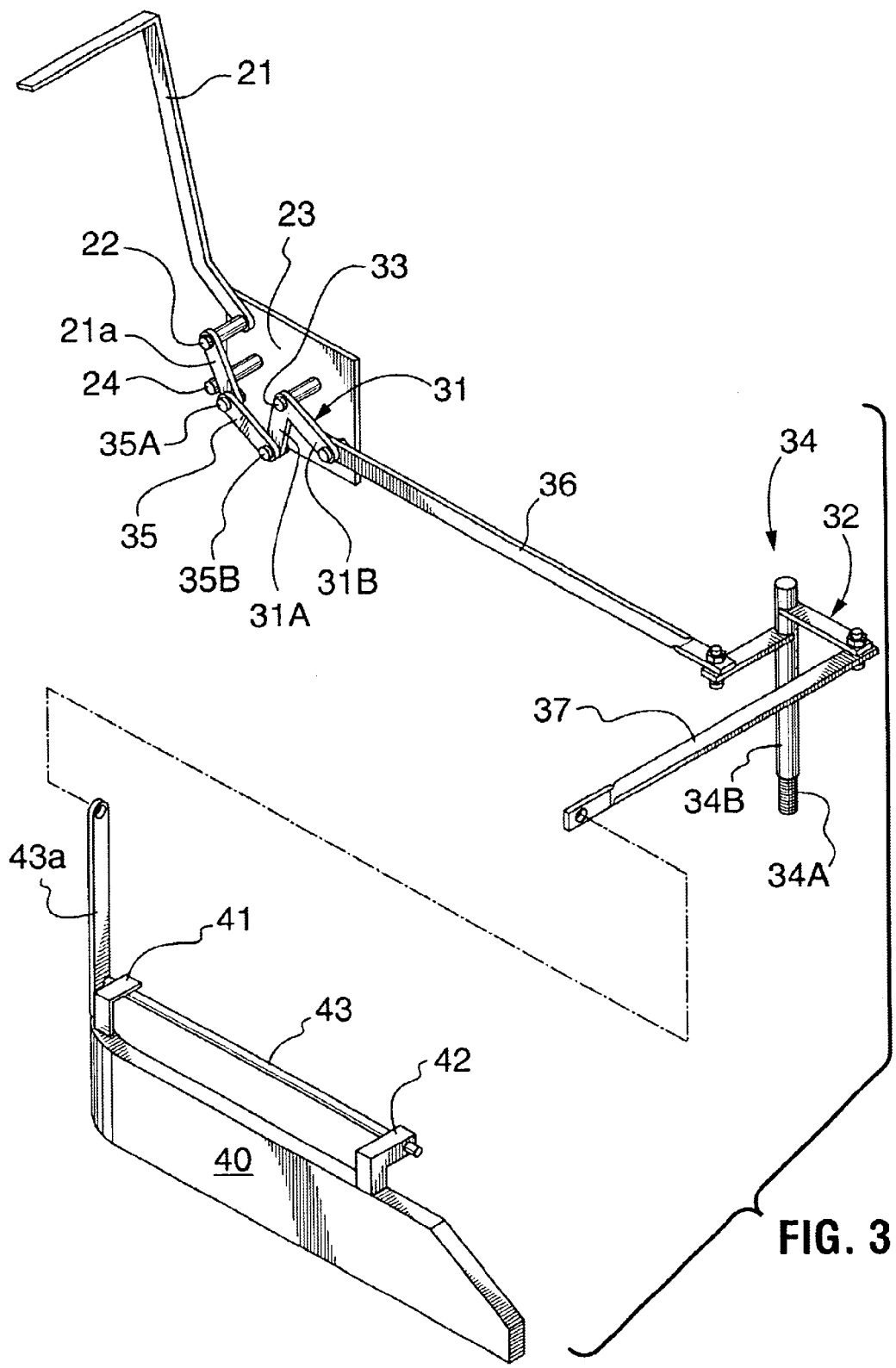
FIG. 3 is an exploded view of the assembly shown in FIG. 2 with a component mounting plate.
Figure 6:
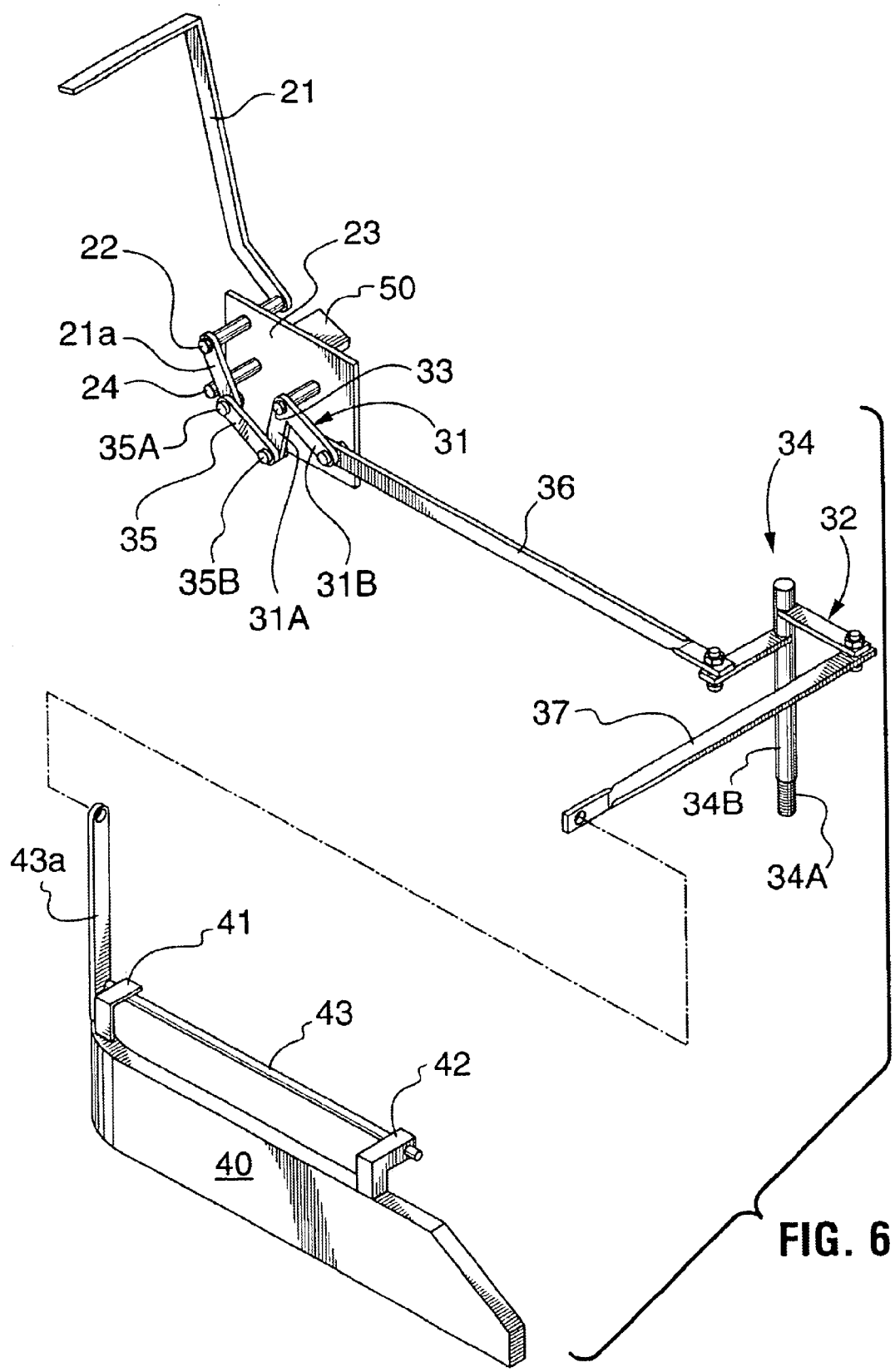
FIG. 6 is an exploded view of the assembly shown in FIG. 3 with a component mounting plate showing the lever mounted on a spindle extending through the mounting plate.
Figure 7:
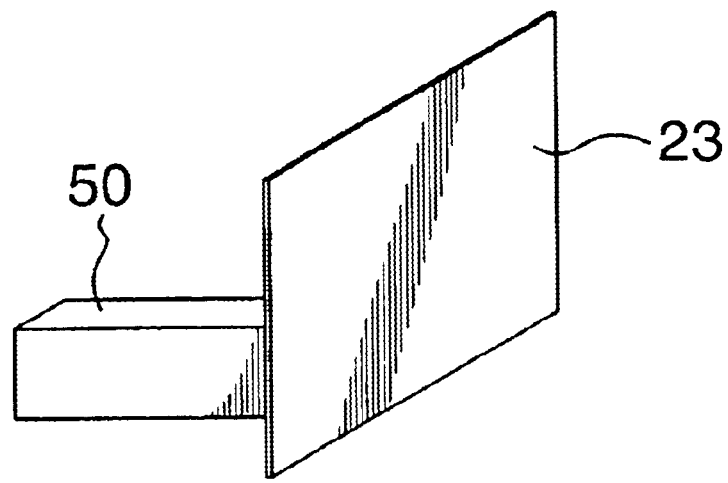
FIG. 7 is a oblique view of an embodiment of a mounting plate including a mounting leg extending at a right angle from the mounting plate forming a bracket.
Figure 8:
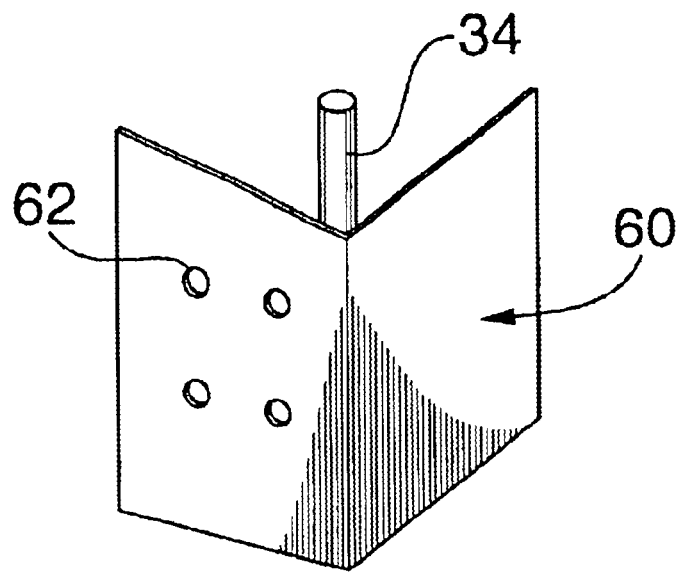
FIG. 8 is an oblique showing an adapter plate for attachment to a mower housing or frame by bolts to support a portion of the linkage assembly.

FIGS. 3 and 6 illustrates the components for mounting on an existing mower and includes two L-shaped members 31, 32, second and third respective links 36, 37 and a door 40 that has the crank arm 43A projecting upwardly therefrom. The member 31 has an extension 31c projecting from the free outer end of the crank arm 31. FIG. 6 shows an embodiment wherein the plate 23 includes a support leg 50 extending at a right angle therefrom for mounting to a horizontal portion of the mower deck or frame or housing and shows the lever extending though the mounting plate 23.

Figure 9:
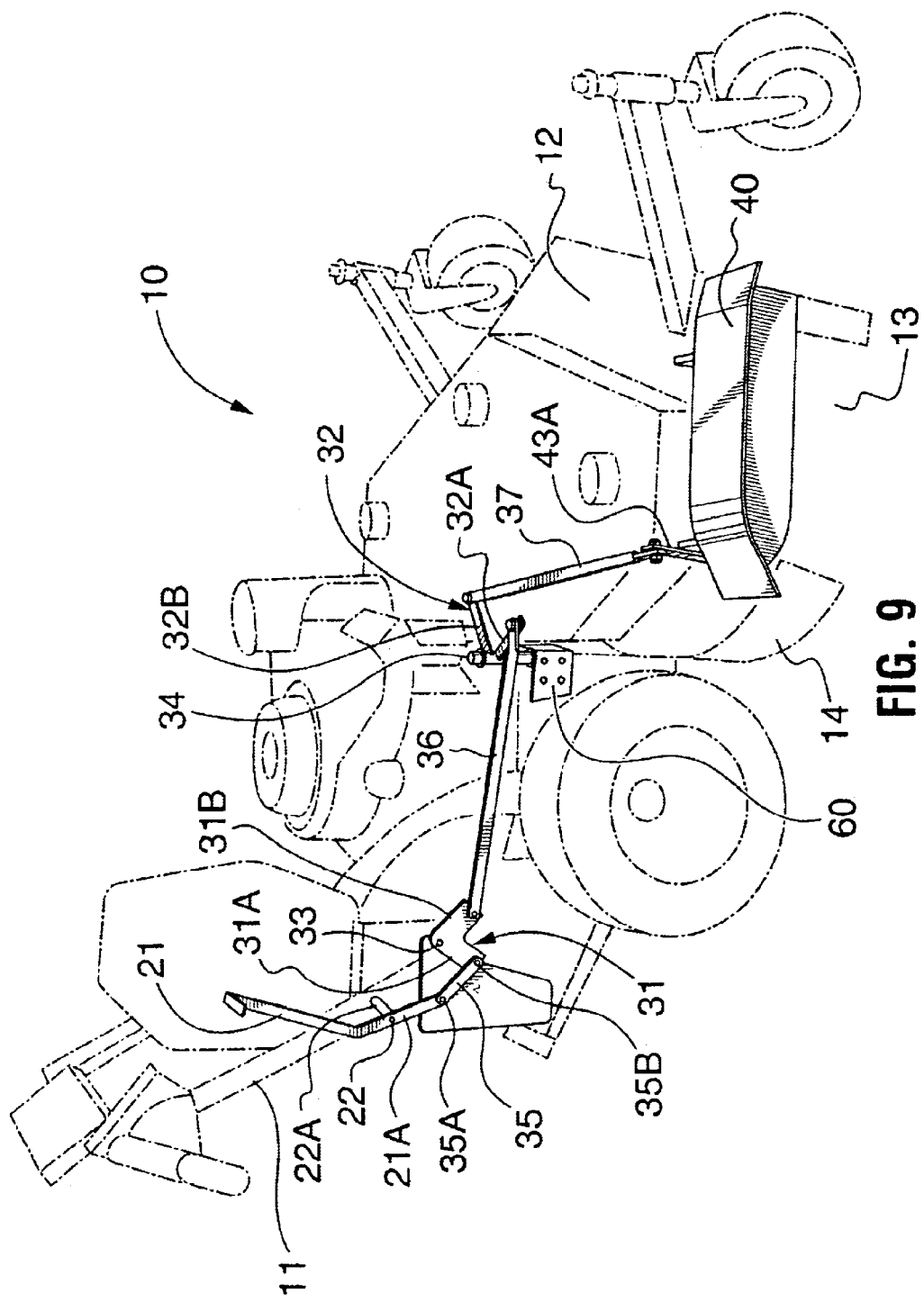
FIG. 9 is an oblique view of the mower shown in FIG. 1, showing the adapter plate of FIG. 8 mounted to the frame of a mower.

FIG. 9 shows the mower embodiment of FIG. 1, wherein the pivot means 34 of the multi-link linkage system extends from an adapter plate 60. One preferred embodiment of the adapter plate 60 includes at least one hole 62 and includes a strip of metal bent at about an angle in order that the adapter conform to the mower frame or housing permitting the adapter to be bolted onto the existing mower frame or housing, whereby the pivot member 34 supports the L-shaped member 32 thereon.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

I claim:

1. A mower discharge door operating linkage mechanism assembly for a power mower of the type having one or more rotatable cutting elements disposed horizontally below an inverted dish like housing that has a cuttings discharge opening in a side wall of the housing and a rigid frame structure, a door mounted on said housing and moveable from one to another of first and second positions respectively covering and uncovering said discharge opening, and a linkage system mounted on said mower for controllably moving said door from one to the other of said first and second positions, said assembly comprising:

a linkage actuator, means mounting said linkage actuator on said mower at a position in easy reach of an operator of the mower during mowing, a first and second pair of L-shaped arcuate members each having a crank arm radiating outwardly from a pivot mounting means thereon, means pivotally connecting said pivot mountain means of said first and second arcuate member on said mower at positions spaced apart from one another, a first link member operatively interconnecting said actuator and one of said crank arms of said first arcuate member, a second link member operatively interconnecting the other one of said crank arms on said first arcuate member and one of the crank arms of said second arcuate member and a third link member operatively interconnecting the other one of said crank arms of said second arcuate member and said door whereby the operator is able to controllably move the discharge door from one to the other of said first and second positions while mowing.

2. The mower discharge door operating linkage mechanism assembly as defined in claim 1, wherein said linkage actuator comprises a lever and means pivotally mounting said lever on said mower and wherein said first link member is pivotally connected to said lever at a position spaced from the pivotal connection of the lever to the mower.

3. The mower discharge door operating linkage mechanism of claim 1, wherein said door is pivotally mounted on said housing for movement from one to the other of said first and second positions.

4. The mower discharge door operating linkage mechanism of claim 1, wherein said door is pivotally mounted on said housing and wherein the pivot axis of said door and the of said first and second arcuate members are mutually perpendicular.

5. The mower discharge door operating linkage mechanism of claim 1, including means cooperating with a portion of said linkage system to retain said door at any selected position intermediate said first and second positions.

6. A mower discharge door operating linkage mechanism assembly for a power mower of the type having one or more rotatable cutting elements disposed horizontally below an inverted dish like housing that has a cuttings discharge opening in a side wall of the housing and a rigid frame structure, a door mounted on said housing and moveable from one to another of first and second positions respectively covering and uncovering said discharge opening, and a linkage system mounted on said mower for controllably moving said door from one to the other of said first and second positions, said assembly comprising:

a linkage actuator, means mounting said linkage actuator on said mower at a position in easy reach of an operator of the mower during mowing, a first and second pair of arcuate members each having a crank arm radiating outwardly from a pivot mounting means thereon, means pivotally connecting said pivot mounting means of said first and second arcuate member on said mower at positions spaced apart from one another, a first link member operatively interconnecting said actuator and one of said crank arms of said first arcuate member, a second link member operatively interconnecting the other one of said crank arms on said first arcuate member and one of the crank arms of said second arcuate member and a third link member operatively interconnecting the other one of said crank arms of said second arcuate member and said door whereby the operator is able to controllably move the discharge door from one to the other of said first and second positions while mowing; and a rigid mounting plate, means mounting said rigid plate on a frame portion of the mower in proximity of the operator and wherein said linkage actuator and said first arcuate member are mounted on said plate.

7. The mower discharge door operating linkage mechanism assembly as defined in claim 6 wherein said linkage actuator comprises a lever and means pivotally mounting said lever on said mower and wherein said first link member is pivotally connected to said lever at a position spaced from the pivotal connection of the lever to the mower.

8. The mower discharge door operating linkage mechanism of claim 6, wherein said door is pivotally mounted on said housing for movement from one to the other of said first and second positions.

9. The mower discharge door operating linkage mechanism of claim 6, wherein said door is pivotally mounted on said housing and wherein the pivot axis of said door and the of said first and second arcuate members are mutually perpendicular.

10. The mower discharge door operating linkage mechanism of claim 6, including means cooperating with a portion of said linkage system to retain said door at any selected position intermediate said first and second positions.

11. A mower discharge door operating linkage mechanism assembly for a power mower of the type having one or more rotatable cutting elements disposed horizontally below an inverted dish like housing that has a cuttings discharge opening in a side wall of the housing and a rigid frame structure, a door mounted on said housing and moveable from one to another of first and second positions respectively covering and uncovering said discharge opening and a linkage system mounted on said mower for controllably moving said door from one to the other of said first and second positions, said assembly comprising:

a linkage actuator, means mounting said linkage actuator on said mower at a position in easy reach of an operator of the mower during mowing, a first and second pair of arcuate members each having a crank arm radiating outwardly from a pivot mounting means thereon, means pivotally connecting said pivot mounting means of said first and second arcuate member on said mower at position space apart from one another, in which the pivot axis of said first and second arcuate members are respectively horizontal and vertical, a first link member operatively interconnecting said actuator and one of said crank arms of said first arcuate member, a second link member operatively interconnecting the other one of said crank arms on said first arcuate member and one of the crank arms of said second arcuate member and a third link member operatively interconnecting the other one of said crank arms of said second arcuate member and said door whereby the operator is able to controllably move the discharge door from one to the other of said first and second positions while mowing.

12. The mower discharge door operating linkage mechanism assembly as defined in claim 11 wherein said linkage actuator comprises a lever and means pivotally mounting said lever on said mower and wherein said first link member is pivotally connected to said lever at a position spaced from the pivotal connection of the lever to the mower.

13. The mower discharge door operating linkage mechanism of claim 11, wherein said door is pivotally mounted on said housing for movement from one to the other of said first and second positions.

14. The mower discharge door operating linkage mechanism of claim 11, wherein said door is pivotally mounted on said housing and wherein the pivot axis of said door and the of said first and second arcuate members are mutually perpendicular.

15. The mower discharge door operating linkage mechanism of claim 6, including means cooperating with a portion of said linkage system to retain said door at any selected position intermediate said first and second positions.

* * * * *